United States Patent [19]
Butler

[11] Patent Number: 5,416,826
[45] Date of Patent: May 16, 1995

[54] GUN SAFE

[76] Inventor: Gerald A. Butler, 4215 Jane St., Redding, Calif. 96002

[21] Appl. No.: 989,214

[22] Filed: Dec. 11, 1992

[51] Int. Cl.⁶ .................... H04M 11/04; E05B 45/06; G08B 13/14
[52] U.S. Cl. ........................ 379/40; 379/45; 379/51; 340/542; 340/570
[58] Field of Search .............. 379/39, 40, 42, 44, 379/45, 51, 445; 340/541, 542, 543, 568, 569, 570, 571, 825.31, 825.34

[56] References Cited

U.S. PATENT DOCUMENTS

| | | | |
|---|---|---|---|
| 3,633,167 | 1/1972 | Hodim | 340/164 |
| 4,532,507 | 7/1985 | Edson et al. | 340/825 |
| 4,663,621 | 5/1987 | Field et al. | 340/542 |
| 4,669,394 | 6/1987 | Fogicman et al. | 109/59 T |
| 4,768,021 | 8/1988 | Ferraro | 340/543 |
| 4,772,877 | 9/1988 | Rice, Jr. et al. | 340/542 |
| 4,931,769 | 6/1990 | Phillips et al. | 340/541 |
| 5,021,776 | 6/1991 | Anderson et al. | 340/542 |
| 5,225,825 | 7/1993 | Warren | 340/825.31 |

FOREIGN PATENT DOCUMENTS

| | | | |
|---|---|---|---|
| 0037573 | 10/1981 | European Pat. Off. | 379/44 |
| 2106354 | 3/1983 | United Kingdom | 379/40 |

*Primary Examiner*—Curtis Kuntz
*Assistant Examiner*—Jason Chan
*Attorney, Agent, or Firm*—Limbach & Limbach; W. Patrick Bengtsson

[57] ABSTRACT

An electronically-operated gun safe which has an telephone system that establishes an interactive telephone contact with law enforcement authorities when the gun safe is opened with an emergency key word. A non-emergency key word allows the gun safe to be opened without establishing a telephone contact with law enforcement authorities. The telephone system provides an alarm when the gun safe is disconnected from an external telephone wire without first opening the gun safe with the non-emergency key word. A 9-1-1 key word allows a telephone contact to be established without opening the gun safe. A master key word allows the gun safe to be opened if the emergency key word is lost or forgotten. The gun safe is locked out for a time period when successive incorrect key words are attempted and a tamper display alerts an owner that an unauthorized entry has been attempted.

20 Claims, 5 Drawing Sheets

GUN SAFE

BACKGROUND OF THE INVENTION

1. Field of the Invention

The present invention relates to safes and, in particular, to an electronically-controlled gun safe which can establish telephone contact with law enforcement authorities when the gun safe is opened.

2. Description of the Related Art

The possibility that a child may discover a loaded hand gun and either seriously injure themselves or another has led hand gun safety groups to strongly encourage hand gun owners to secure their hand guns to prevent such an occurrence. Hand guns are typically secured by unloading the hand gun, placing a trigger lock or a similar disabling device on the gun, and then placing the gun and the ammunition is separate locations which are inaccessible to the child.

The problem with securing the hand gun in the above-described fashion is that many hand gun owners possess the hand gun for personal self-protection. When several minutes are spent retrieving a hidden key for a trigger lock, then several more minutes are spent retrieving the hidden gun and ammunition, and then several more minutes are spent removing the trigger lock and loading the gun, the utility of the hand gun for personal self-protection is significantly reduced. Intruders typically will not provide an individual with a ten minute warning prior to an assault.

One secure method of maintaining a loaded hand gun is to store the hand gun in a safe. Safes provide an obvious degree of protection from children as well as thieves. Although safes provide security, most well-known types of safes have one of several significant disadvantages.

First, safes which require the manipulation of a mechanical tumbler to open the safe can take a significant amount of time as well as physical dexterity to open. The time and dexterity required to manipulate a mechanical tumbler make these types of safes are unsuited for situations where a quick response time may be important.

An electronically-opened safe which typically utilizes a "telephone-style" keypad for entry of the combination, such as the safe described in Fogleman et al., U.S. Pat. No. 4,669,394, provides a significant advantage in that this type of safe can be quickly opened by entering a simple key code.

Second, regardless of the opening method utilized, safes are typically bulky and constructed from a heavy metallic material which, in addition to providing a secure environment for a hand gun or other valuables, deters a thief from removing the safe so that the safe can be broken into at a later time. Because of the very nature of bulky and heavy safes, they are typically stored in remote hidden locations which can structurally support the safe and which also make quick access to a hand gun unlikely. Although possible, it is difficult to imagine that many hand gun owners would opt to place this type of safe next to their bed at home or in a visible area at work. Thus, there is a need for a gun safe which utilizes a electronic opening, which is relatively compact and lightweight, and which also deters a thief from removing the safe for later entry.

Third, in an intrusion or other emergency situation, when access to a hand gun is an appropriate response, law enforcement authorities typically recommend that they be immediately contacted and that direct confrontation with an intruder or other emergency situation be avoided when possible. While it is common in the art to incorporate automatic telephone message systems into security systems, such as a burglar alarm, the automatic telephone system is only activated when the security of the system has been breached. Thus, if a safe with an automatic telephone message system is properly opened, law enforcement authorities receive no notice of a potential emergency situation. Therefore, there is a need for an electronically-opened safe which can be used in a manner whereby law enforcement authorities are contacted anytime the safe is under urgent conditions opened.

Automatic telephone message systems are typically limited to signalling that a security breach has occurred. Direct communication with law enforcement authorities that an intruder or another emergency situation is present is more likely to ensure a rapid response, as compared, for example, with a burglar alarm which may be treated as a false alarm. Thus, there is a need for an electronically-opened safe that automatically contacts law enforcement authorities when the safe is opened and which provides a method for direct voice communication, Finally, current gun safes, whether electronic or manual, can become useless if the key code or key is lost. Thus, some provision must be made to allow for access to the gun safe where a key code has been forgotten, without losing any degree of security once such a provision is known.

SUMMARY OF THE INVENTION

To overcome the disadvantages of the prior art, the present invention is an electronically-opened gun safe that automatically contacts law enforcement authorities when the safe is opened under certain conditions and which provided a method for direct voice communication.

The gun safe includes structural components which include a housing, a drawer, and locking means. The housing has walls which define an interior region. One of walls has a drawer opening which opens into the interior region. The drawer is positioned within the drawer opening and mounted to the housing by the mounting means so that the drawer can move from an open position to a closed position and from a closed position to an open position. The locking means locks the drawer to the housing in the closed position.

The gun safe comprises electronic components that include electronic code entry means, processor means which are responsive to the electronic code entry means, telephone means which are responsive to the processor means, and lighted display means. The lighted display means, which are positioned on the exterior side of one of the housing walls, indicate a status of the gun safe.

The electronic code entry means, which are positioned on an exterior side of one of the housing walls, permits the entry of key codes. The processor means, which are positioned in the interior region of the housing, stores key code data and an operating program. When a key code has been entered, the processor means retrieves and processes the key code data to determine whether a valid key code has been entered in the electronic code entry means. The processor means can respond to several valid key codes which can include, for example, an emergency key code, a non-emergency key code, a master key code, and a 9-1-1 key code.

When an emergency key code is entered, the processor both releases the locking means, thereby releasing the drawer and exposing the contents of the drawer and enables the telephone means to establish a direct telephonic interactive contact with law enforcement authorities. The processor means can release the locking means by, for example, transmitting an open drawer signal. The processor means can enable the telephone means by, for example, transmitting an enable signal to the telephone means.

When the telephone means is enabled, the telephone means, which is also positioned within the interior region of the housing and which is connectable to an external telephone line, automatically dials an emergency number and establishes a telephone contact via the external telephone line. The telephone means can include, for example, a speaker phone.

When a non-emergency key code or a master key code is entered into the code entry means, the processor means releases the locking means without enabling the telephone means. In the preferred embodiment, the non-emergency key code can be entered by entering one of the key pad symbols prior to entering a valid key code. The non-emergency key code allows the gun safe to be opened in non-emergency conditions.

The master key code is a controlled key code which can only be utilized once. The master key code provides a method for opening the gun safe if the valid key code has been lost or forgotten. Security is maintained, however, by automatically changing the master key code each time such a key code is used.

When a 9-1-1 key code is entered into the code entry means, the processor means enables the telephone means without releasing the locking means. The 9-1-1 key code allows emergency officials to be contacted via the external telephone wire without providing access to the gun safe.

The processor means can also perform additional functions which include, for example, a lock-out function, a tamper function, an alarm function, and a program function. The lock out function allows the processor to lock out a valid key code for a predetermined period of time after a predetermined number of improper key codes have been entered. The tamper function allows the display means to indicate when the processor is locked out. The tamper function notifies an owner that an unauthorized entry into the gun safe has been attempted.

The alarm function allows an alarm to sound when the telephone means is disconnected from the external telephone line without first entering a valid key code. The alarm function deters children and other individuals from removing the gun safe from its original position. The program function allows the processor to be reprogrammed with a new valid key code. The program function allows the owner the flexibility of changing key codes whenever desired.

A better understanding of the features and advantages of the invention will be obtained by reference to the following detailed description of the invention and accompanying drawings which set forth an illustrative embodiment in which the principles of the invention are utilized.

DETAILED DESCRIPTION OF THE INVENTION

Figure 1:
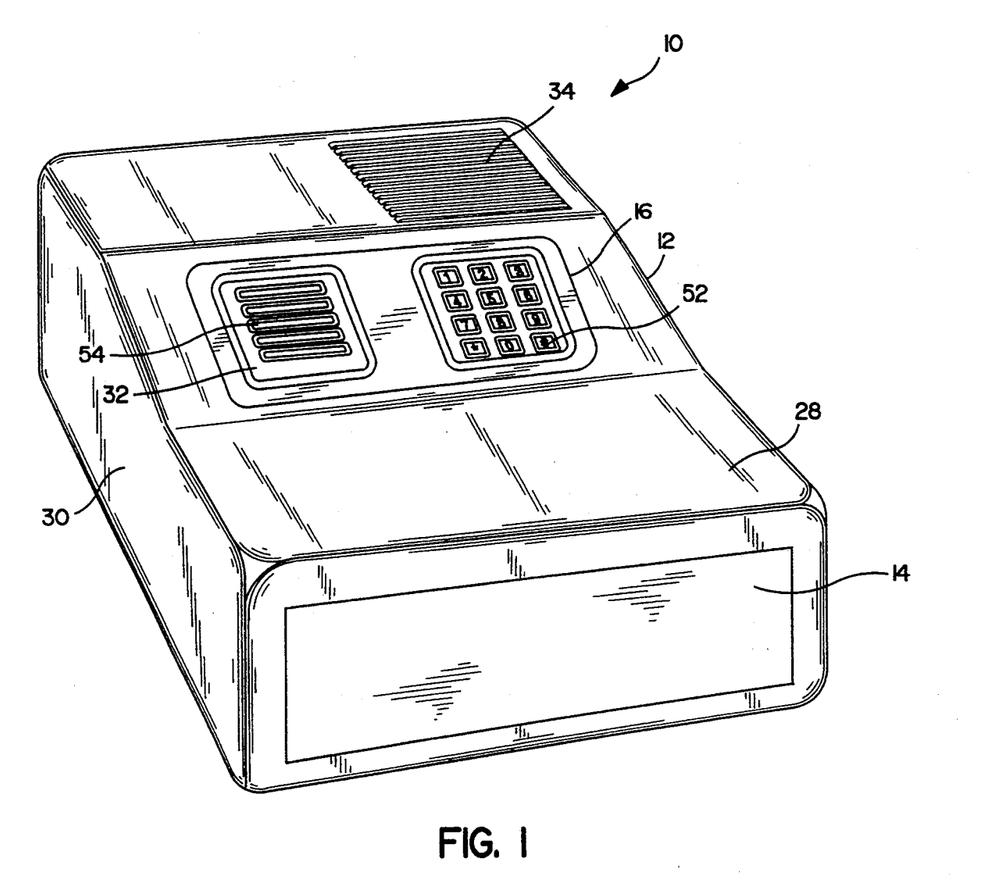
FIG. 1 shows a top-left side perspective view of an embodiment of a gun safe 10 in accordance with the present invention.

FIG. 1 shows a top-left side perspective view of an embodiment of a gun safe 10 in accordance with the present invention. Gun safe 10, which can be positioned on a table or any generally flat surface, is a self-contained, electronically-controlled containment system for storing a hand gun. Gun safe 10 prevents children and thieves from gaining access to the hand gun and, in emergency situations, permits the owner quick access to the hand gun while, if desired, simultaneously notifying law enforcement authorities of a pending emergency situation.

As shown in FIG. 1, gun safe 10 includes a housing 12 that has a drawer opening (not shown in FIG. 1), a drawer 14 positioned within the drawer opening, and an electronic code entry and display system 16 that permits entry of key codes and that displays the status of gun safe 10.

Figure 2:
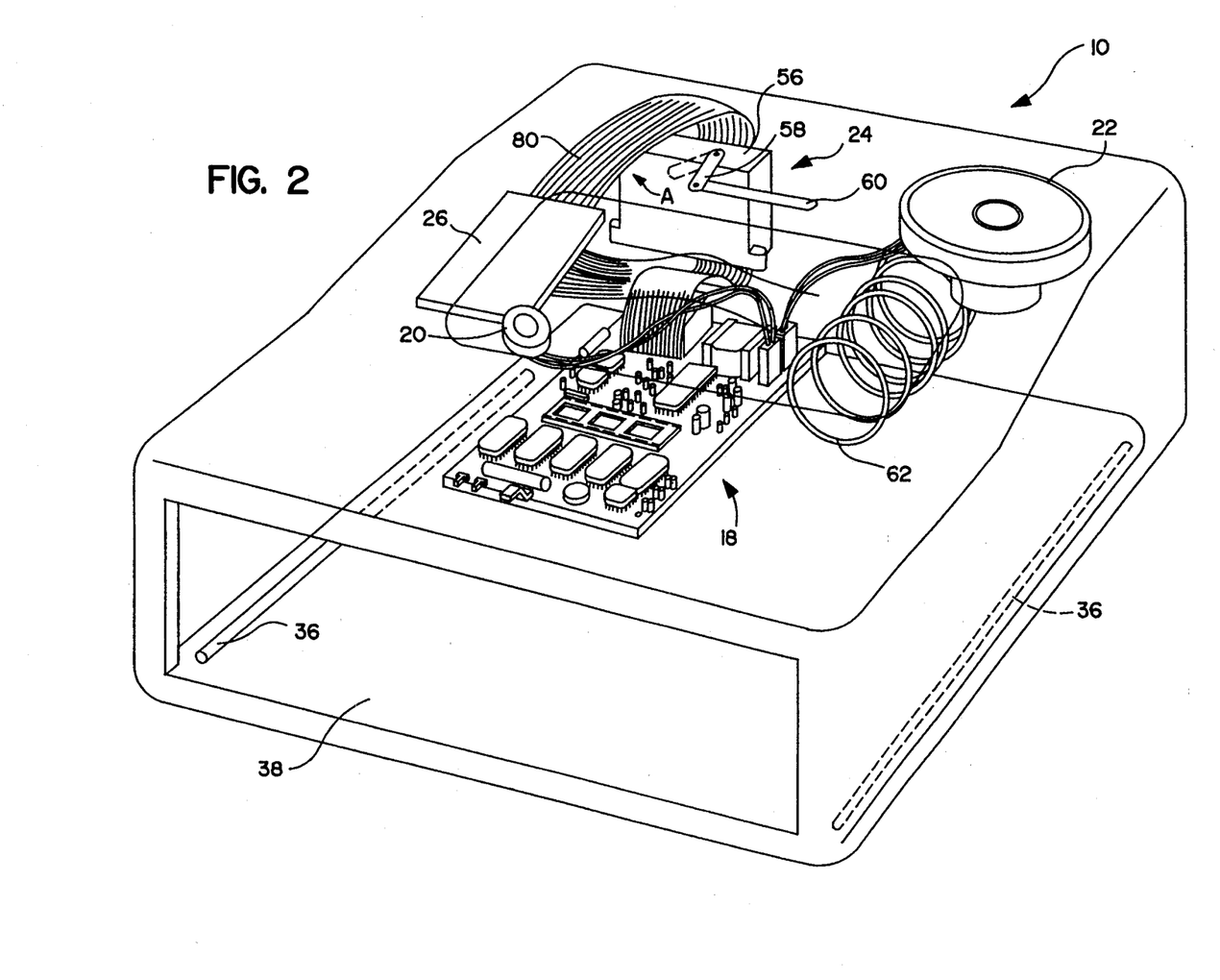
FIG. 2 shows a top right-side diagrammatic perspective view of an embodiment gun safe 10 of the present invention.

FIG. 2 shows a top right-side diagrammatic perspective view of an embodiment of gun safe 10 of the present invention. As shown in FIG. 2, gun safe 10 further includes electronic circuitry 18 that operates gun safe 10, a telephone microphone 20 and a speaker 22 for communicating with law enforcement authorities, locking hardware 24 that securely locks drawer 14 within housing 12, and an LED array 26.

Referring again to FIG. 1, housing 12 generally has a top wall 28, a bottom wall (not shown in FIG. 1) and side walls 30 which define an interior region (not shown in FIG. 1) for storing the hand gun, as well as locating electronic circuitry 18, telephone microphone 20, speaker 22, and the locking hardware 24 (see FIG. 2).

Top wall 28 of housing 12 has a first series of adjacently positioned slit openings 32 that provide an external opening for microphone 20 (see FIG. 2), a second series of adjacently positioned slit openings 34 that provide an external opening for speaker 22 (see FIG. 2), and an electronics opening (not shown in FIG. 1) that provides an opening for connecting electronic code entry and display system 16 to electronic circuitry 18 (see FIG. 2).

The bottom wall of housing 12 has a modular telephone receptacle opening (not shown in FIG. 1) in which a standard modular telephone jack is positioned (not shown in FIG. 1). The modular telephone jack provides an electrical connection between an external telephone wire and electronic circuitry 18.

Referring again to FIG. 2, housing 12 also includes guide ridges 36 that guide drawer 14 (see FIG. 1) in drawer opening 38 of housing 12 so that drawer 14 can be moved from a closed position to an open position, thereby allowing access to the contents of drawer 14.

Figure 3:
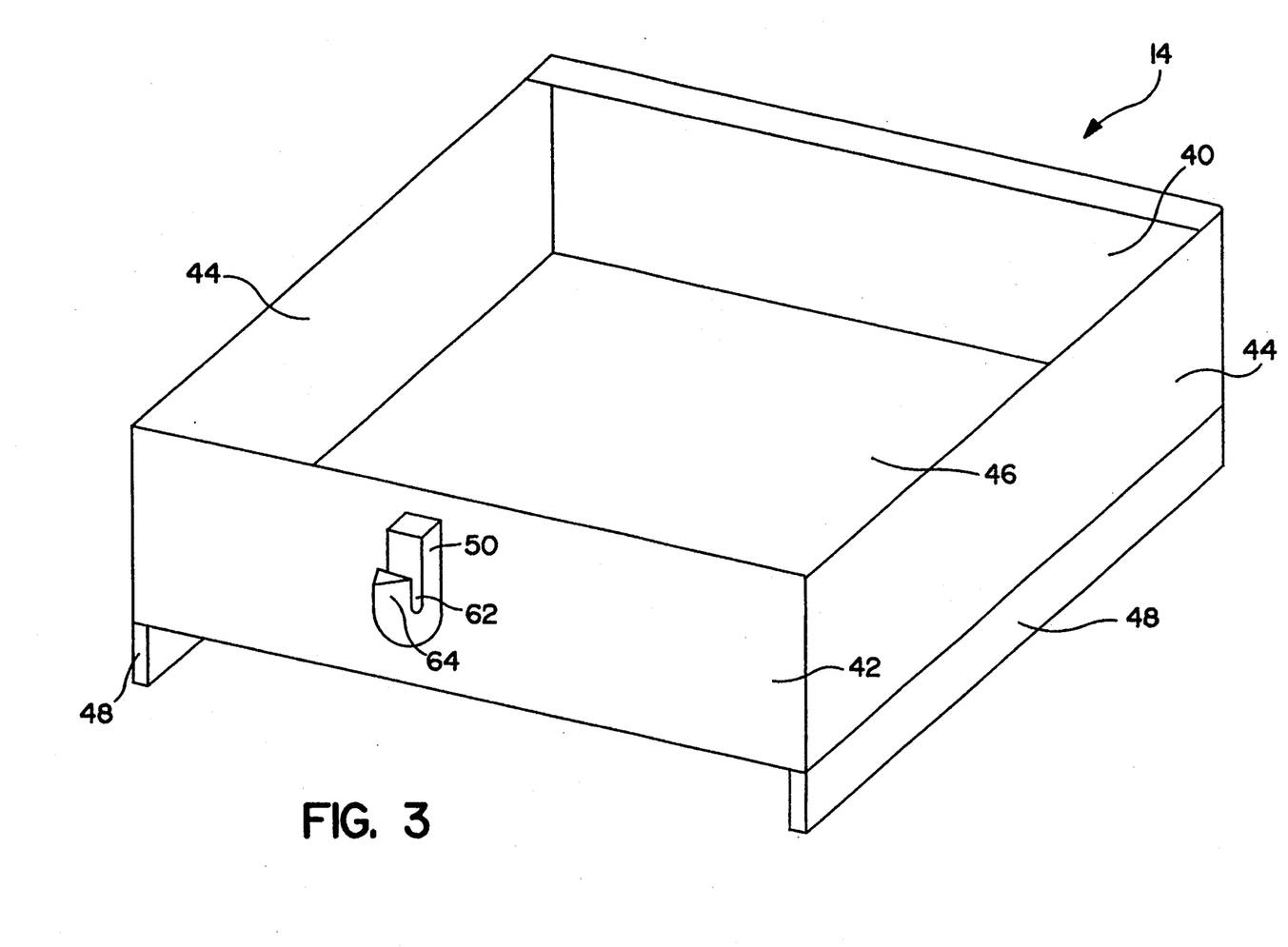
FIG. 3 shows a top right-side perspective of an embodiment of drawer 14 in accordance with the present invention.

FIG. 3 shows an embodiment of drawer 14 in accordance with the present invention. As shown in FIG. 3, drawer 14 has a front wall 40, a back wall 42, side walls 44, a bottom wall 46, rails 48, and hook 50. As described in greater detail below, hook 50 interacts with locking hardware 24 to securely lock drawer 14 within housing 12.

When drawer 14 is positioned within the drawer opening (see FIG. 3), rails 48 are guided along the top surface of the bottom wall of housing 12 by guide ridges 36 as drawer 14 is moved from a closed position to an open position and from an open position to a closed position. Although rails 48 and guide ridges 36 are utilized as described above, drawer 14 can be positioned within housing 12 utilizing any well-known method of mounting a drawer into a housing.

Housing 12 and drawer 14 can be molded or manufactured out of weather and vandal resistant metal, plastic, resins or composite materials, and are preferably constructed from ABS plastic. In the closed position, drawer 14 is slightly recessed within housing 12 to resist attempts at prying drawer 14 open.

Referring again to FIG. 1, electronic code entry key pad and display assembly 16, which permits entry of key codes and displays the status of gun safe 10, is mounted in an indented region on top wall 28 of housing 12 over the electronics opening. While top wall 28 is preferred, key pad and display assembly 16 may alternatively be mounted in one or more of the other outer housing walls provided that it is exposed to the exterior of housing 12 so that it is accessible to a user for entry of a key code.

Key pad and display assembly 16 preferably includes twelve vandal resistant keys 52, which have numerical legends, and a series of display regions 54, which are illuminated by the LED array (not shown in FIG. 1). As shown in FIG. 1, each display region 54 is labeled with a status condition. The status conditions include, for example, the correct entry of a key code, the incorrect entry of a key code, a tamper condition (see below), a lockout condition (see below), and a low battery condition.

In the preferred embodiment of the present invention, key pad and display assembly 16 are provided as a single unit. Alternately, a separate key pad and a separate display assembly can be utilized.

Referring again to FIG. 2, locking hardware 24, which securely locks drawer 14 within housing 12, includes a driver motor 56, a pivot pin 58, a locking bar 60, and a first bias spring 62. As shown, locking bar 60 is in a closed or locked position. Referring to FIGS. 2 and 3, when locking hardware 24 is released, driver motor 56 pulls locking bar 60 in the direction A via pivot pin 58 until locking bar 60 is withdrawn from a locking channel 62 of hook 50. When locking bar 60 is withdrawn from locking channel 62, bias spring 62 pushes drawer 14 open. Once drawer 14 opens, driver motor 56 releases locking bar 60 which returns to the closed position via a second bias spring (not shown in FIG. 2).

When drawer 14 is closed, locking bar 60 contacts a beveled surface 64 of hook 50 which again pushes locking bar 60 in the direction A. Once locking bar 60 passes beyond beveled surface 64, the second bias spring returns locking bar 60 to the locking channel 62. Alternately, locking hardware 28 can include any well-known method of locking and unlocking a drawer.

Figure 4A:
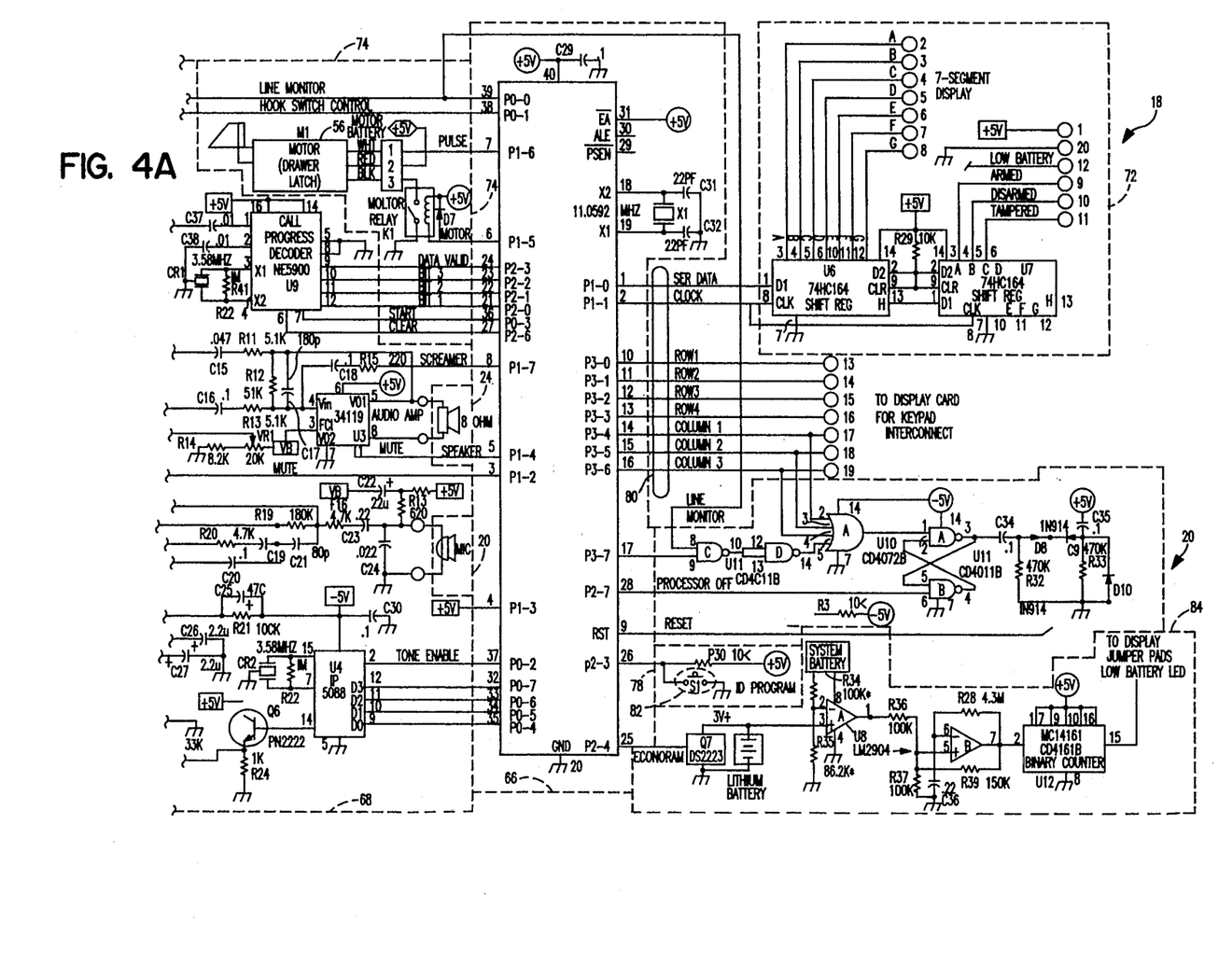
FIGS. 4A and 4B shows a schematic diagram of an embodiment of electronics system 22 in accordance with the present invention.
Figure 4B:
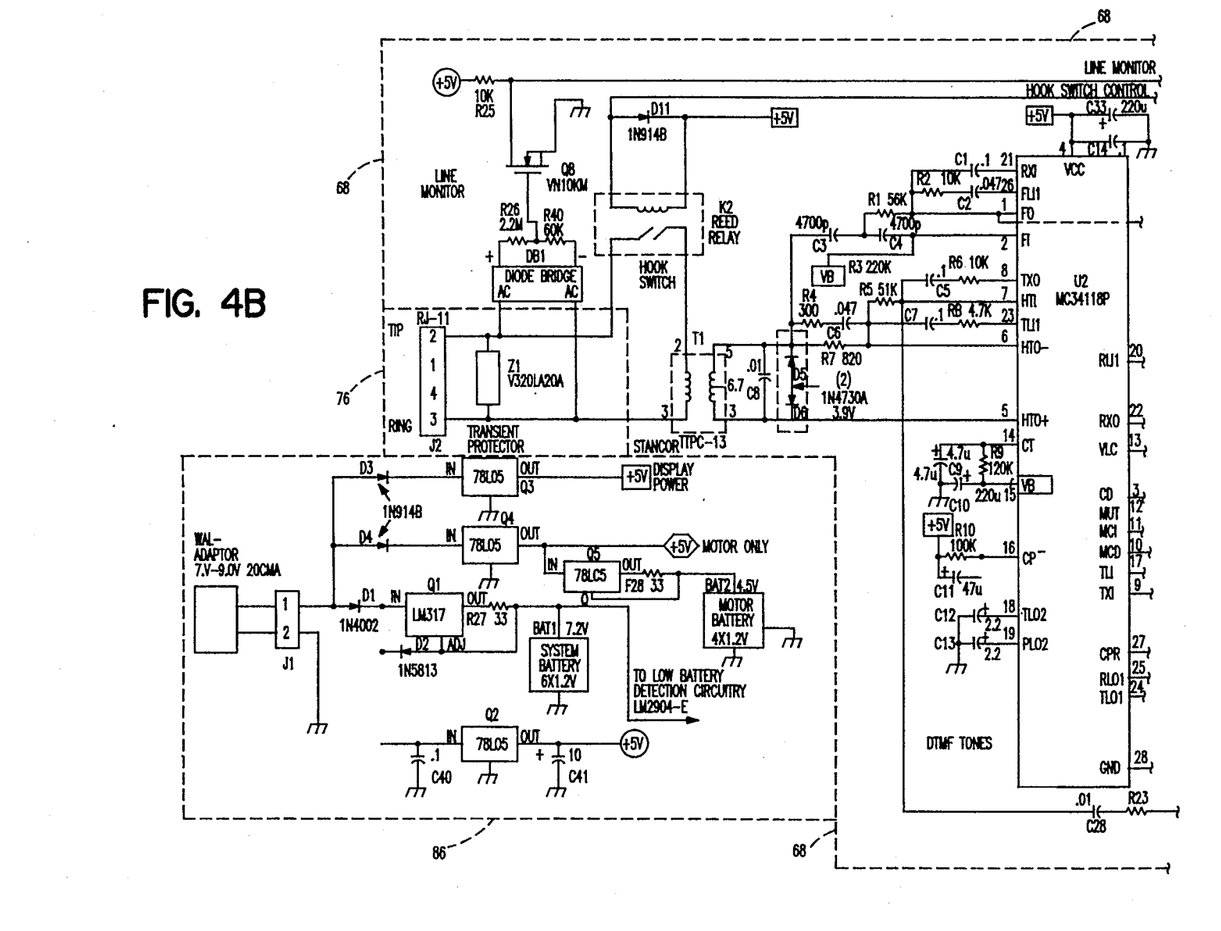

FIGS. 4A and 4B show a schematic diagram of an embodiment of electronic circuitry 18 in accordance with the present invention. As shown in FIGS. 4A and 4B, electronic circuitry 18 includes a processor 66, telephone circuitry 68, power circuitry 70, LED circuitry 72 of LED array 26 (see FIG. 2), locking circuitry 74 of locking hardware 24, modular jack circuitry 76, and program circuitry 78.

Processor 66 stores key code data and an operating program in a digital memory located within processor 66. When a key code has been entered, the key code is transferred to processor 66 via ribbon cable 80 (see also FIG. 2). Processor 66 receives the key code, retrieves key code data from the digital memory, and compares the key code to the key code data to determine whether a valid key code has been entered into key pad and display assembly 16 (see FIG. 1).

Processor 66 can respond to several valid key codes which include an emergency key code, a non-emergency key code, a master key code, and a 9-1-1 key code. When the emergency key code is entered, processor 66 both releases locking hardware 24, thereby releasing drawer 14 and exposing the contents of drawer 14 and enables telephone circuitry 68 to establish a direct interactive contact with law enforcement authorities.

As shown in FIGS. 4A and 4B, processor 66 releases locking hardware 24 by transmitting an open drawer signal to lock motor 56 of locking hardware 24. In response to the open drawer signal, lock motor 56 withdraws locking bar 60 as described above (see FIG. 2).

Processor 66 enables telephone circuitry 68 by transmitting a series of command signals to telephone circuitry 68. When telephone circuitry 68 receives the series of command signals, telephone circuitry 68, which is also positioned within the interior region of housing 12 and which is connectable to an external telephone line via the modular telephone jack 76, automatically dials an emergency number and establishes a telephone contact via the external telephone line.

Once telephone contact has been made, an owner can interactively communicate with the law enforcement authorities via microphone 20 and speaker 22. In the preferred embodiment of the present invention, telephone circuitry 68, microphone 20, and speaker 22 comprise a speaker phone.

When a non-emergency key code or a master key code is entered into the code entry and display apparatus 16, processor 66 releases locking hardware 24 as described above without generating the series of command signals. Thus, the contents of drawer 14 are exposed without establishing a telephone contact with law enforcement authorities.

In the preferred embodiment, the non-emergency key code can be entered by entering the "#" symbol on the key pad and display assembly 16 prior to entering the emergency code. Alternately, any one or more key pad numerals or symbols can be utilized to indicate a non-emergency key code. The non-emergency key code allows gun safe 10 to be opened in non-emergency conditions.

Gun safe 10 can be opened with a master key code without establishing telephone contact with law enforcement authorities. The master key code allows gun safe 10 to be opened in the event that the emergency code has been lost or forgotten. Processor 66 contains a master code program which discards the master key code each time it is utilized and calculates a new master key code. Thus, each master code can only be used one time.

The master key code and each succeeding master key code can be controlled by the manufacturer or a similar service group so that owner identification can be properly assured before a master code is released. By randomly assigning one of a large number of master codes to each gun safe 10, it is unlikely that the master code obtained by one owner will operate the gun safe of another owner.

When the 9-1-1 key code is entered into the code entry and display apparatus 16, processor 66 transmits the series of command signals to telephone circuitry 68, thereby establishing a telephone contact with law enforcement authorities, without releasing locking hardware 24. In situations when access to the hand gun is not appropriate or is not needed, the 9-1-1 key code allows emergency officials to be contacted via the external telephone wire by a baby sitter or other individuals without providing access to gun safe 10.

In the preferred embodiment, processor 66 also provides a lock out function, a tamper function, an alarm function, and a program function. The lockout function allows processor 66 to lock out valid key code entries for five minutes when three successive false key codes have been entered. Alternately, the lock out time and the number of incorrect entries which trigger the lock out function can be varied.

The tamper function allows processor 66 to transmit a tamper signal to the key pad and display assembly 16 when the lockout function has been activated. The tamper notifies an owner that entry into gun safe 10 has been attempted by children or other unauthorized individuals. The tamper function can be reset by opening gun safe 10.

The alarm function allow processor 66 to transmit an alarm signal to speaker 22 when the external telephone line is disconnected from gun safe 10 without first opening gun safe 10. Speaker 22 generates a loud sound in response to the alarm signal. This function deters children and thieves from removing gun safe 10 from its original location.

The program function, which is activated by an ID program switch 82 of program circuitry 78, allows processor 66 to accept a new emergency key code. The program function allows the emergency key code to be changed as desired.

Power circuitry 70 includes an internal battery circuit 84 and an external power adaptor circuit 86. Internal battery circuit 84, which is located within housing 12, provides power to all of the internal electronics that require power via a battery while external power adaptor circuit 86 provides power via an external power supply. LED circuitry 72 translates a serial bit stream generated by processor 66 to a parallel bit stream for display by the key pad and display assembly 16 (see FIG. 1)

The electronics components, which preferably can operate in a wide range of temperatures, are preferably mounted with surfaced mounted technology and are of the CMOS variety for very low power consumption. Furthermore, the CMOS devices preferably have a "sleeping" function that extends the battery life. In other words, the main functions of electronic circuitry 18 are shut off until there is a keystroke that "wakes up" the unit.

Processor 66 may be a model 87C57 or 80C51 which is manufactured by Signetics-Phillips. Telephone circuitry 68 can be a standard speaker phone circuit such as model MC34118 manufactured by Signetics-Phillips, and motor 56 can be a standard model manufactured by Royal.

It should be understood that various alternatives to the embodiments of the invention described herein may be employed in practicing the invention. It is intended that the following claims define the scope of the invention and that structures and methods within the scope of these claims and their equivalents be covered thereby.

What is claimed is:

1. A gun safe comprising:
   a housing having walls defining an interior region, one of said walls having a drawer opening into said interior region;
   a drawer positioned within said drawer opening so that said drawer can be moved from a closed position to an open position, thereby allowing access to the contents of said drawer, said drawer including a gun receptacle;
   locking means for locking said drawer in said closed position;
   electronic code entry means positioned on an exterior side of said housing walls for permitting entry of key codes;
   telephone means positioned within said interior region of said housing for permitting interactive communication across an external telephone line, said telephone means including a speakerphone;
   processor means positioned in said interior region of said housing and responsive to said electronic code entry means for storing key code data and an operating program, for retrieving and processing said key code data to determine whether a valid key code has been entered in said electronic code entry means, for releasing said locking means and enabling said telephone means upon entry of a key code; and
   lighted display means positioned on said exterior side of said housing walls for displaying a status of said processor means.

2. The gun safe of claim 1 wherein said processor means locks out said key code for a predetermined period of time after a predetermined number of improper key codes have been entered.

3. The gun safe of claim 2 wherein said processor means generates a tamper signal when said key code is locked out by said processor means and wherein said lighted display means generates a tamper display in response to said tamper signal.

4. The gun safe of claim 1 wherein said processor means further includes a program switch for setting said key code.

5. The gun safe of claim 1 wherein said processor means enables said telephone means in response to a 9-1-1 key code without releasing said locking means.

6. The gun safe of claim 1 wherein said processor means releases said locking means upon entry of a master key code.

7. The gun safe of claim 6 wherein said processor means generates and stores a new master key code in response to releasing said locking means upon entry of said master key code.

8. The gun display of claim 1 where in said telephone means generates an alarm when said telephone means is disconnected from said external telephone line without first entering said key code.

9. A gun safe comprising:

a housing having walls defining an interior region, one of said walls having a drawer opening into said interior region;

a drawer positioned within said drawer opening so that said drawer can be moved from a closed position to an open position, thereby allowing access to the contents of said drawer, said drawer including a gun receptacle;

locking means for locking said drawer in said closed position;

electronic code entry means positioned on an exterior side of said housing walls for permitting entry of key codes;

telephone means positioned within said interior region of said housing for permitting interactive communication across an external telephone lines; and process means positioned in said interior region of said housing and responsive to said electronic code entry means for storing key code data and an operating program, for retrieving and processing said key code data to determine whether a valid key code has been entered in said electronic code entry means, for releasing said locking means and enabling said telephone means upon entry of a key code.

10. The gun safe of claim 9 wherein said telephone means includes a speakerphone.

11. The gun safe of claim 9 and further comprising alarm means positioned within said interior region of said housing and responsive to said telephone means for generating an alarm when said telephone means is disconnected from said external telephone line without first entering said key code.

12. The gun safe of claim 9 wherein said processor means locks out said key code for a predetermined period of time after a predetermined number of improper key codes have been entered.

13. The gun safe of claim 9 and further including display means positioned on said exterior side of said housing walls for displaying a status of said processor means.

14. The gun safe of claim 13 wherein said processor means generates a tamper signal when said key code is locked out by said processor means and wherein said display means generates a tamper display in response to said tamper signal.

15. The gun safe of claim 13 wherein said display means is lighted.

16. The gun safe of claim 9 wherein said processor means further includes a program switch for setting said key code.

17. The gun safe of claim 9 wherein said processor means enables said telephone means in response to a 9-1-1 key code without releasing said locking means.

18. The gun safe of claim 9 wherein said processor means releases said locking means upon entry of a master key code.

19. The gun safe of claim 18 wherein said processor means generates and stores a new master key code in response to releasing said locking means upon entry of said master key code.

20. The gun safe of claim 9 wherein said processor means releases said locking means and disables said telephone means in response to entry of a modified key code.

* * * * *